(12) United States Patent
Amin

(10) Patent No.: US 7,899,852 B2
(45) Date of Patent: Mar. 1, 2011

(54) SYSTEMS, METHODS, AND APPARATUS FOR QUASI-ADIABATIC QUANTUM COMPUTATION

(75) Inventor: Mohammad H. S. Amin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 899 days.

(21) Appl. No.: 11/777,910

(22) Filed: Jul. 13, 2007

(65) Prior Publication Data

US 2008/0162613 A1     Jul. 3, 2008

Related U.S. Application Data

(60) Provisional application No. 60/830,814, filed on Jul. 14, 2006.

(51) Int. Cl.
*G06J 1/00*     (2006.01)
*G06G 1/00*     (2006.01)

(52) U.S. Cl. .......................... 708/2; 708/801

(58) Field of Classification Search ............... 708/2, 708/801
See application file for complete search history.

(56) References Cited

U.S. PATENT DOCUMENTS

| | | | |
|---|---|---|---|
| 6,838,694 B2 | 1/2005 | Esteve et al. .................. 257/34 |
| 7,018,852 B2 | 3/2006 | Wu et al. ....................... 438/2 |
| 2005/0082519 A1 | 4/2005 | Amin et al. .................... 257/13 |
| 2006/0147154 A1 | 7/2006 | Thom et al. ................... 385/37 |
| 2006/0225165 A1 | 10/2006 | Maassen van den Brink et al. ......................... 977/933 |
| 2007/0180586 A1 | 8/2007 | Amin .......................... 977/755 |
| 2008/0086438 A1* | 4/2008 | Amin et al. .................... 706/33 |
| 2008/0109500 A1* | 5/2008 | Macready et al. .............. 708/2 |

FOREIGN PATENT DOCUMENTS

| | | |
|---|---|---|
| WO | 2004/075104 A2 | 9/2004 |
| WO | 2004/075104 A3 | 9/2004 |

OTHER PUBLICATIONS

U.S. Appl. No. 60/762,619, filed Jan. 27, 2006, Amin.
U.S. Appl. No. 60/872,414, filed Jan. 12, 2007, Rose et al.
U.S. Appl. No. 60/886,253, filed Jan. 23, 2007, Harris.
Amin et al., "Thermally assisted adiabatic quantum computation," arXiv.org:cond-mat/0609332v2, 1-5, Mar. 2, 2007.
Blatter et al., "Design aspects of superconducting-phase quantum bits," *Physical Review B* 63(17):1-9, 2001.
Farhi et al., "Quantum Computation by Adiabatic Evolution," arXiv. org:quant-ph/0001106v1, 1-24, Jan. 28, 2000.
Farhi et al., "A Quantum Adiabatic Evolution Algorithm Applied to Random Instances of an NP-Complete Problem," arXiv.org; quant-ph/0104129v1, 1-15, Apr. 26, 2001.

(Continued)

*Primary Examiner*—Tan V Mai
(74) *Attorney, Agent, or Firm*—Seed IP Law Group PLLC

(57) ABSTRACT

Methods, systems and apparatus for quasi-adiabatic quantum computation include initializing a quantum processor to a ground state of an initial Hamiltonian and evolving the quantum processor from the initial Hamiltonian to a final Hamiltonian via an evolution Hamiltonian, wherein anti-crossings of the evolution Hamiltonian are passed non-adiabatically.

49 Claims, 6 Drawing Sheets

OTHER PUBLICATIONS

Farhi et al., "A Quantum Adiabatic Evolution Algorithms versus Simulated Annealing," arXiv.org:quant-ph/0201031v1, 1-16, Jan. 8, 2002.

Farhi et al., "Quantum Adiabatic Evolution Algorithms with Different Paths," arXiv.org:quant-ph/0208135v1, 1-10, Aug. 21, 2002.

Feynman, "Simulating Physics with Computers," *International Journal of Theoretical Physics* 21(6/7):467-488, 1982.

Friedman et al., "Quantum superposition of distinct macroscopic states," *Nature* 406:43-46, Jul. 6, 2000.

Il'ichev et al., "Continuous Monitoring of Rabi Oscillations in a Josephson Flux Qubit," *Physical Review Letters* 91(9):1-4, Aug. 29, 2003.

Knysh et al., "Adiabatic Quantum Computing in systems with constant inter-qubit couplings," arXiv.org:quant-ph0511131v2, 1-10, Nov. 15, 2005.

Makhlin et al., "Quantum-state engineering with Josephson-junction devices," *Reviews of Modern Physics* 73(2):357-400, Apr. 2001.

Mizel et al., "Scaling considerations in ground-state quantum computation," *Physical Review A* 65(2):1-6, Jan. 15, 2002.

Mooij et al., "Josephson Persistent-Current Qubit," *Science* 285:1036-1039, Aug. 13, 1999.

Nielsen et al., *Quantum Computation and Quantum Information*, Cambridge University Press, Cambridge, 2000, Chap. 7.8, "Other Implementation Schemes," 343-345.

Orlando et al., "Superconducting persistent-current qubit," *Physical Review B* 60(22):398-413, Dec. 1, 1999.

Roland et al., "Quantum search by local adiabatic evolution," *Physical Review A* 65(4):1-6, Mar. 26, 2002.

Sarandy et al., "Adiabatic Quantum Computation in Open Systems," *Physical Review Letters* 95(25):1-4, Dec. 16, 2005.

Shor, "Introduction to Quantum Algorithms," arXiv.org:quant-ph/0005003v2, 1-17, Jul. 6, 2001.

Kieu, "Quantum Adiabatic Computation and the Travelling Salesman Problem," arXiv:quant-ph/0601151v2, pp. 1-7, Mar. 29, 2006.

Pérez et al., "Non adiabatic quantum search algorithms," arXiv:0706.1139v1 [quant-ph], pp. 1-7, Jun. 8, 2007.

Schilling et al., "Nonadiabatic Transitions for a Decaying Two-Level-System: Geometrical and Dynamical Contributions," arXiv:quant-ph/060722v1, pp. 1-12, Jul. 31, 2006.

Wallquist, "Controllable coupling of superconducting qubits and implementation of quantum gate protocols," Thesis for the Department of Microtechnology and Nanoscience Applied Quantum Physics Laboratory, Chalmers University of Technology, pp. v.-73, 2006.

Wellard et al., "A Non-Adiabatic Controlled Not Gate for the Kane Solid State Quantum Computer," arXiv:quant-ph/0108103v1, pp. 1-8, Aug. 23, 2001.

Wilkinson et al., "Non-adiabatic transitions in multi-level systems," arXiv:quant-ph/9908018v1, 38 pages, Aug. 4, 1999.

\* cited by examiner

SYSTEMS, METHODS, AND APPARATUS FOR QUASI-ADIABATIC QUANTUM COMPUTATION

CROSS REFERENCE TO RELATED APPLICATION

This application claims benefit, under 35 U.S.C. §119(e), of U.S. Provisional Patent Application No. 60/830,814, filed Jul. 14, 2006, which is incorporated herein, by reference, in its entirety.

1. FIELD OF THE INVENTION

The present systems, methods and apparatus relate to quantum computation and specifically, to modified or "quasi-"adiabatic quantum computation.

2. BACKGROUND

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers" International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

2.1 Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. The circuit model requires that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms" arXiv.org:quant-ph/0005003 (2001), pp. 1-27. Such art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, and simulated annealing, and are described, for example, in Farhi, E. et al., "Quantum Adiabatic Evolution Algorithms versus Simulated Annealing" arXiv.org:quant-ph/0201031 (2002), pp 1-16.

2.2 Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of 2 states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

2.3 Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference is superconducting phase between two regions of the phase device. Recently, hybrid devices using two or more of charge, flux and phase degrees of freedom have been developed. See e.g., U.S. Pat. No. 6,838,694 and U.S. Patent Publication No. 2005-0082519.

2.4 Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165 and U.S. Provisional Patent Application Ser. No. 60/872,414, filed Jan. 12, 2007 and entitled "System, Devices and Methods for Interconnected Processor Topology".

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). Those of skill in the art will appreciate that a SQUID that incorporates more than two Josephson junctions may also be used. The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in U.S. patent application Ser. No. 11/247,857 and U.S. Provisional Patent Application Ser. No. 60/886,253, filed Jan. 23, 2007 and entitled "SYSTEMS, DEVICES, AND METHODS FOR CONTROLLABLY COUPLING QUBITS". Respective coupling strengths of the coupling devices may be tuned between zero and a maximum value, for example, to provide ferromagnetic or anti-ferromagnetic coupling between qubits.

2.5 Adiabatic Quantum Computation

As mentioned previously, adiabatic quantum computation typically involves evolving a system from a known initial Hamiltonian (the Hamiltonian being an operator whose eigenvalues are the allowed energies of the system) to a final Hamiltonian by gradually changing the Hamiltonian. If the evolution is too fast, then the system can be excited to a higher state, such as the first excited state. There may exist points in the evolution of the system Hamiltonian where excitation out of the ground state is easiest because the ground state and first excited state are especially close in energy. These points are referred to as "anti-crossings". Evolution Hamiltonians usually only possess one anti-crossing, but some may have more than one or none at all.

For the present purposes, an "adiabatic" evolution is considered to be an evolution that satisfies the adiabatic condition at all points during the evolution, wherein the adiabatic condition is expressed as:

$$\dot{s}|\langle 1|dH_e/ds|0\rangle|=\delta g^2(s)$$

where $\dot{s}$ is the time derivative of s, g(s) is the difference in energy between the ground state and first excited state of the system (also referred to herein as the "gap size") as a function of s, and δ is a coefficient much less than 1. At any point during the evolution, if the adiabatic condition is not satisfied, then at that point the evolution is considered non-adiabatic for the present purposes. An evolution may be adiabatic at some points in time while non-adiabatic at others.

A simple example of a linear adiabatic evolution is:

$$H_e=(1-s)H_i+sH_f$$

where $H_i$ is the initial Hamiltonian, $H_f$ is the final Hamiltonian, $H_e$ is the evolution or instantaneous Hamiltonian, and s is evolution coefficient which controls the rate of evolution. The coefficient s goes from 0 to 1, such that at the beginning of the evolution process the evolution Hamiltonian is equal to the initial Hamiltonian and at the end of the process the evolution Hamiltonian is equal to the final Hamiltonian.

The rate that s changes, sometimes referred to as an evolution or annealing schedule, is normally constant and slow enough that the system is always in the instantaneous ground state of the evolution Hamiltonian during the evolution, and transitions at anti-crossings (i.e., when the gap size is smallest) are avoided. However, this constrains the evolution to be unnecessarily slow even at points where the gap size is large.

Although adiabatic quantum computation is thought to be faster at solving some computational problems than classical computers, the speed is limited by the fact that the quantum system must be evolved slowly enough to avoid excitations out of the ground state. Farhi et al., 2002, arXiv.org:quant-ph/0208135 propose using faster non-linear evolution schedules. Mizel et al., 2002, *Physical Review A* 65, 022315 analyze the impact that the gap size has on adiabatic evolutions, but do not suggest a method of overcoming the difficulties that anti-crossings pose. Sarandy et al., *Physical Review Letters* 95, 250503 analyze situations where the adiabaticity of the evolution breaks down and suggest speeding up the evolution and performing it many times. However, they still adhere to the adiabatic principle and do not propose methods to make any part of the evolution non-adiabatic. Knysh et al., 2005, arXiv.org:quant-ph/0511131 disclose a method of adiabatic quantum computation on a lattice of qubits with constant couplings, but do not disclose methods of improving the speed of adiabatic quantum computation. Roland et al., 2002, *Physical Review A* 65, 042308 describe a method of slowing down the adiabatic evolution at known points where an anti-crossing occurs, where the slow-down is proportional to the gap size of the anti-crossing. At points far away from anti-crossings, the evolution can be sped up. However, this technique is still unsatisfactory because it is difficult to determine the exact point where an anti-crossing occurs during the adiabatic evolution and its corresponding gap size. As a consequence, for an arbitrary evolution Hamiltonian, this technique is not effective. Further details on adiabatic quantum computing systems, methods, and apparatus are described in U.S. patent application Ser. No. 11/625,702.

Thus, while methods for improving the speed of adiabatic quantum computation have been proposed, such proposals are unsatisfactory in that they fail to provide a satisfactory means of handling anti-crossings, and thus such proposals include evolution schedules where the evolution must still be very slow through anti-crossings.

3. BRIEF DESCRIPTION OF THE DRAWINGS

Figure 1:
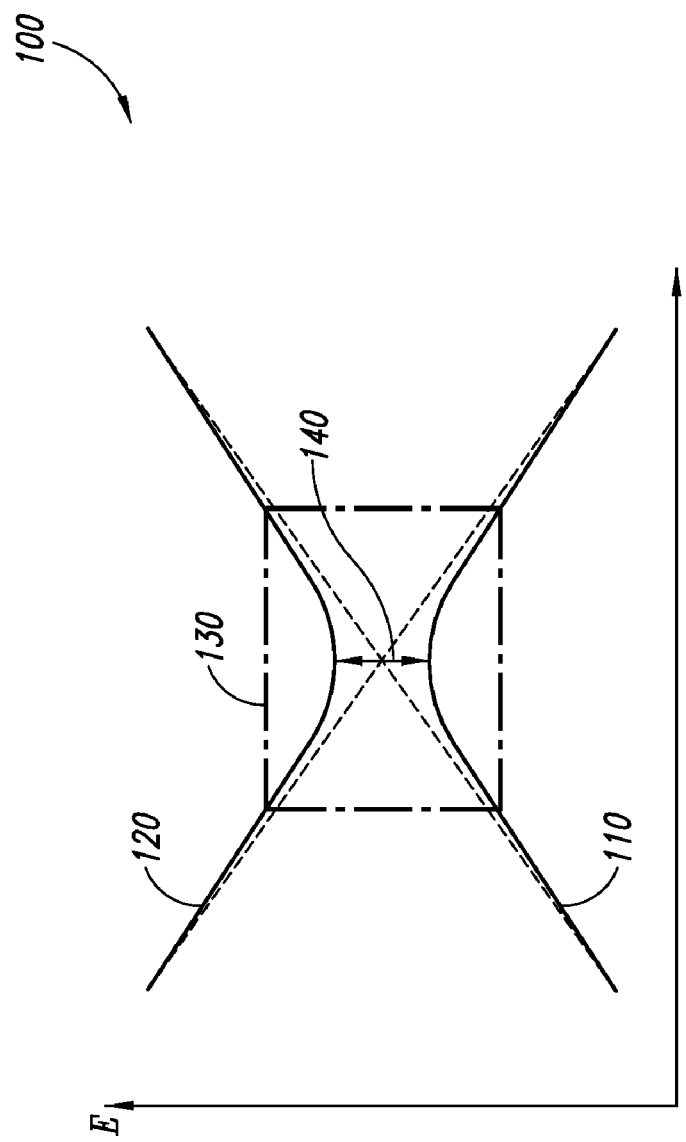
FIG. 1 is a schematic diagram illustrating an arbitrary anti-crossing in accordance with the prior art.

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not intended to convey any information regarding the actual shape of the particular elements and have been solely selected for ease of recognition in the figures. Furthermore, while the figures may show specific layouts, one skilled in the art will appreciate that variations in design, layout, and fabrication are possible and the shown layouts are not to be construed as limiting the layout of the present systems, methods and apparatus.

4. SUMMARY OF THE INVENTION

In one aspect, a method of quantum computation comprising initializing a quantum processor to a ground state of an initial Hamiltonian and evolving the quantum processor from the initial Hamiltonian to a final Hamiltonian via an evolution Hamiltonian, wherein evolving the quantum processor comprises exciting the quantum processor to an excited state of the evolution Hamiltonian and non-adiabatically passing an anti-crossing of the evolution Hamiltonian.

In another aspect, a quantum computation system, comprising a quantum processor, an excitation device configurable for exciting the quantum processor from a first state to a second state, and a digital processor in communication with the quantum processor, a memory storing a set of processor executable instructions that cause the digital processor to facilitate quantum processing, by initializing the quantum processor to a ground state of an initial Hamiltonian and evolving the quantum processor from the initial Hamiltonian to a final Hamiltonian via an evolution Hamiltonian, wherein evolving the quantum processor includes exciting the quantum processor to an excited state of the evolution Hamiltonian via the excitation device and non-adiabatically passing an anti-crossing of the evolution Hamiltonian.

In still another aspect, a computer program product for use with a computer system, the computer program product comprising a computer readable storage medium and a computer program mechanism embedded therein, the computer program mechanism comprising instructions for initializing a quantum processor to a ground state of an initial Hamiltonian and instructions for evolving the quantum processor from the initial Hamiltonian to a final Hamiltonian via an evolution Hamiltonian, wherein the instructions for evolving the quantum processor comprise instructions for exciting the quantum processor to an excited state of the evolution Hamiltonian via the excitation device and instructions for non-adiabatically passing an anti-crossing of the evolution Hamiltonian.

In still another aspect, a method of quantum computation, comprising initializing a quantum processor to a ground state of a first Hamiltonian and evolving the quantum processor from the first Hamiltonian to a second Hamiltonian via an evolution Hamiltonian, wherein evolving the quantum processor comprises non-adiabatically passing an anti-crossing of the evolution Hamiltonian and measuring an end state of the quantum processor.

In still another aspect, a method of quantum computation, comprising initializing a quantum processor to a ground state of an initial Hamiltonian and evolving the quantum processor from the initial Hamiltonian to a final Hamiltonian via an evolution Hamiltonian, wherein evolving the quantum processor comprises thermally mixing a state of the quantum processor and measuring a final state of the quantum processor.

5. DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

In accordance with the present devices and methods, computational problems are solved using adiabatic quantum computation on a quantum processor. In some embodiments, the adiabatic quantum computation comprises initializing a quantum processor to an initial Hamiltonian and evolving the quantum processor from the initial Hamiltonian to a final Hamiltonian via an evolution Hamiltonian. In some embodiments, the evolution comprises thermally exciting the quantum processor to an excited state of the evolution Hamiltonian and non-adiabatically passing an anti-crossing of the energy of the evolution Hamiltonian. Non-adiabatically passing an anti-crossing comprises violating the adiabatic condition ($\dot{s}|\langle 1|dH_e/ds|0\rangle|=\delta g^2(s)$) at points close to an anti-crossing.

FIG. 1 illustrates the energy profile 100 of an anti-crossing which can occur during adiabatic evolution of a quantum processor. State 110 is the ground state of the quantum processor during evolution, and state 120 is the first excited state. In the vicinity of the anti-crossing, shown as dashed area 130, the energies of the ground state and the first excited state approach one another. The gap size, that is, the difference in energy between the ground state and the first excited state, is at its smallest value at the anti-crossing (shown as gap 140). When the Hamiltonian of a quantum processor has an anti-crossing, there is possibility of a Landau-Zener transition occurring at the anti-crossing. In general, for a quantum processor in a superposition of the ground and first excited states, a Landau-Zener transition switches the probability amplitudes of the two states. For example, if $P_0$ and $P_1$ are the probabilities of the quantum processor being in the ground and first excited states respectively, a Landau-Zener transition may flip the two probability amplitudes such that $P_0$ would be the probability of being in the first excited state and $P_1$ would be the probability of being in the ground state.

A quantum processor that was initially totally in its ground state ($P_0=1$) may be totally in the first excited state ($P_1=1$) following a Landau-Zener transition when passing an anti-crossing. Likewise, if a quantum processor that is initially totally in the first excited state undergoes a Landau-Zener transition, then it may completely switch down to the ground state. The probability that a Landau-Zener transition will occur at a given anti-crossing depends on several things, including how fast the anti-crossing is passed and the size of gap 140. In general, the more quickly the quantum processor passes the anti-crossing, the greater the probability of transition. Similarly, the smaller the size of gap 140, the greater the probability of transition.

Figure 2:
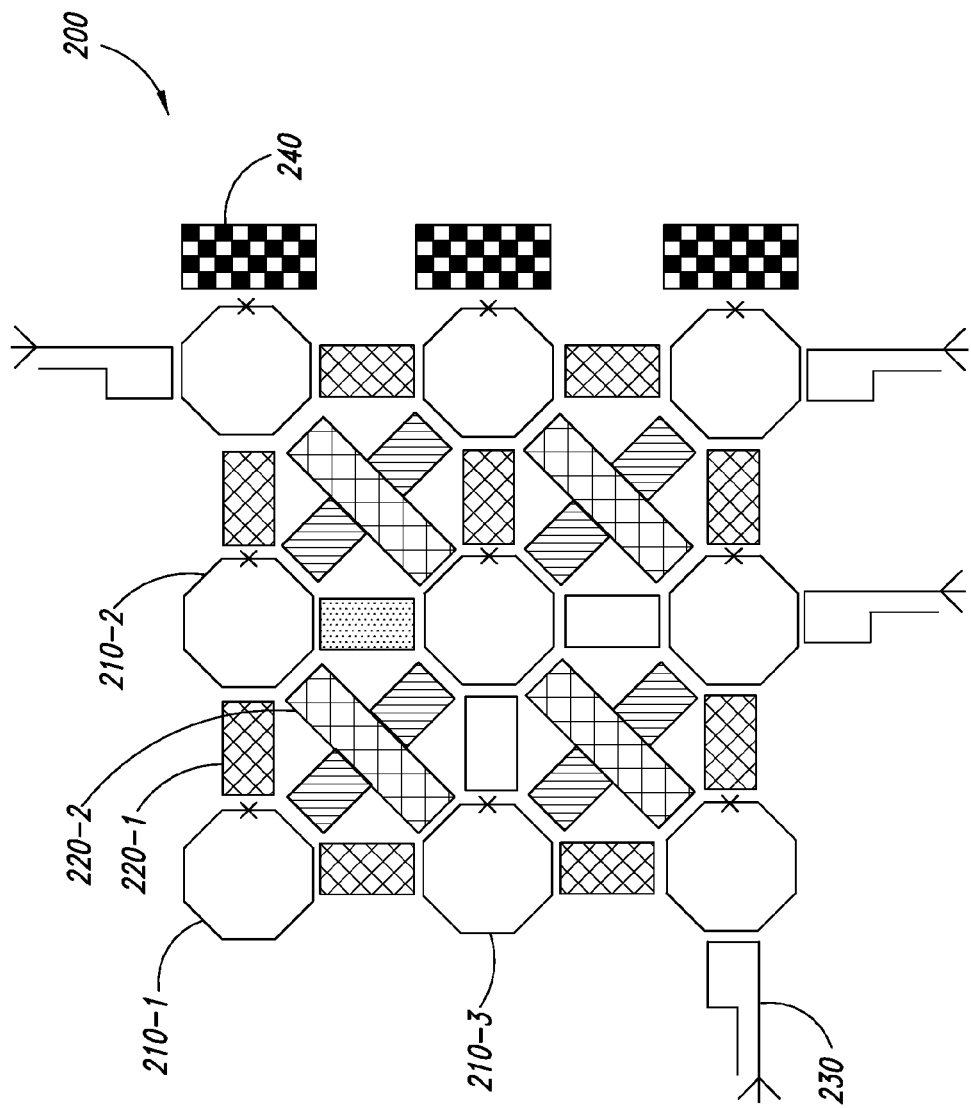
FIG. 2 is a schematic diagram illustrating a portion of a quantum processor according to one illustrative embodiment.

FIG. 2 illustrates a portion of a quantum processor which may be used in conjunction with the present systems, methods and apparatus, although those of skill in the art will appreciate that other quantum processors may be employed, such as quantum processors with topologies other than the topology shown. System 200 comprises a plurality of qubits 210-1, 210-2, 210-3 (collectively 210, only three called out) arranged in a two-dimensional array. Qubits useful in the present systems, methods and apparatus include superconducting flux qubits or superconducting charge qubits, such as rf-SQUIDs, which may comprise a superconducting loop interrupted by one Josephson junction, and persistent current qubits, which may comprise a superconducting loop interrupted by three Josephson junctions. See, e.g., Mooij et al., 1999, *Science* 285, 1036; and Orlando et al., 1999, *Phys. Rev. B* 60, 15398. Other examples of superconducting qubits can be found in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used, such as for example the hybrid qubits described in U.S. Pat. No. 6,838,694 and US 2005-0082519.

System 200 also comprises a plurality of coupling devices 220-1, 220-2, (collectively 220, only two called out) used to couple the states of qubits 210 together. Some coupling devices may be configured to couple nearest-neighbor qubits together, such as coupling device 220-1 (which is configured to couple qubits 210-1 and 210-2 together), while others are configured to couple next-nearest neighbor qubits together, such as coupling device 220-2 (which is configured to couple qubits 210-1 and 210-3 together). Coupling devices 220 useful in the present systems, methods and apparatus include rf-SQUIDs and dc-SQUIDs (which includes a superconducting loop interrupted by two Josephson junctions), which couple qubits together by flux. In some embodiments, coupling devices 220 may couple qubits 210 together ferromagnetically (the coupling drives the coupled qubits 210 to have the same state) and anti-ferromagnetically (the coupling drives the coupled qubits 210 to have opposite states).

System 200 also comprises a plurality of local bias devices 230 (only one called out) capable of providing a localized bias to qubits 210. While four local flux bias devices 230 are shown in FIG. 2, the number of local bias devices 230 is not restricted to four and the type of bias device is not restricted to flux bias devices. Although not illustrated, all or a portion of the qubits in system 200 may have associated local bias devices 230. In some embodiments of the present systems, methods and apparatus, local bias devices 230 may comprise a loop of metal in proximity to a superconducting qubit that provides an external flux bias to the qubit. In some embodiments, the local bias device 230 may also comprise a plurality of Josephson junctions.

System 200 may also comprise at least one readout device 240 (only one called out), capable of reading out the states of all or some of qubits 210. While three readout devices 240 are illustrated in FIG. 2, the number of readout devices 240 is not limited to three. In some embodiments of the present systems, methods and apparatus, readout devices 240 may comprise a dc-SQUID, while in others, readout devices 240 may comprise a tank circuit. Still other embodiments may implement combinations of dc-SQUIDs, tank circuits, or still other devices not explicitly listed herein. In some embodiments, readout devices 240 read out the state of one or more qubits 210 in the flux regime while in others, readout devices 240 read out the state of one or more qubits 210 in the charge regime. In some embodiments, both charge-based readout devices 240 and charged-based local bias devices 230 may be used.

Traditional adiabatic quantum computation comprises evolving the quantum processor in such a way that it always remains in the ground state of its evolution Hamiltonian. Thus anti-crossings, or points where excitation out of the ground state is more likely, present problems for successfully accomplishing adiabatic quantum computation. In contrast, in the present systems, methods and apparatus, anti-crossings are used to assist the adiabatic quantum computation, a practice hereinafter referred to as "quasi-adiabatic" quantum computation, since instead of remaining in the ground state during the whole evolution (i.e., adiabatic evolution), the present systems, methods and apparatus intentionally employ non-adiabaticity at certain points during the evolution. For example, in some embodiments, the evolution is configured to pass a given anti-crossing in the evolution Hamiltonian non-adiabatically, while thermal mixing of the states of the quantum processor occurs during the evolution. Alternatively, in other embodiments, the quantum processor is excited before non-adiabatically passing an anti-crossing and then undergoes a Landau-Zener transition back to the ground state at the anti-crossing.

Figure 3:
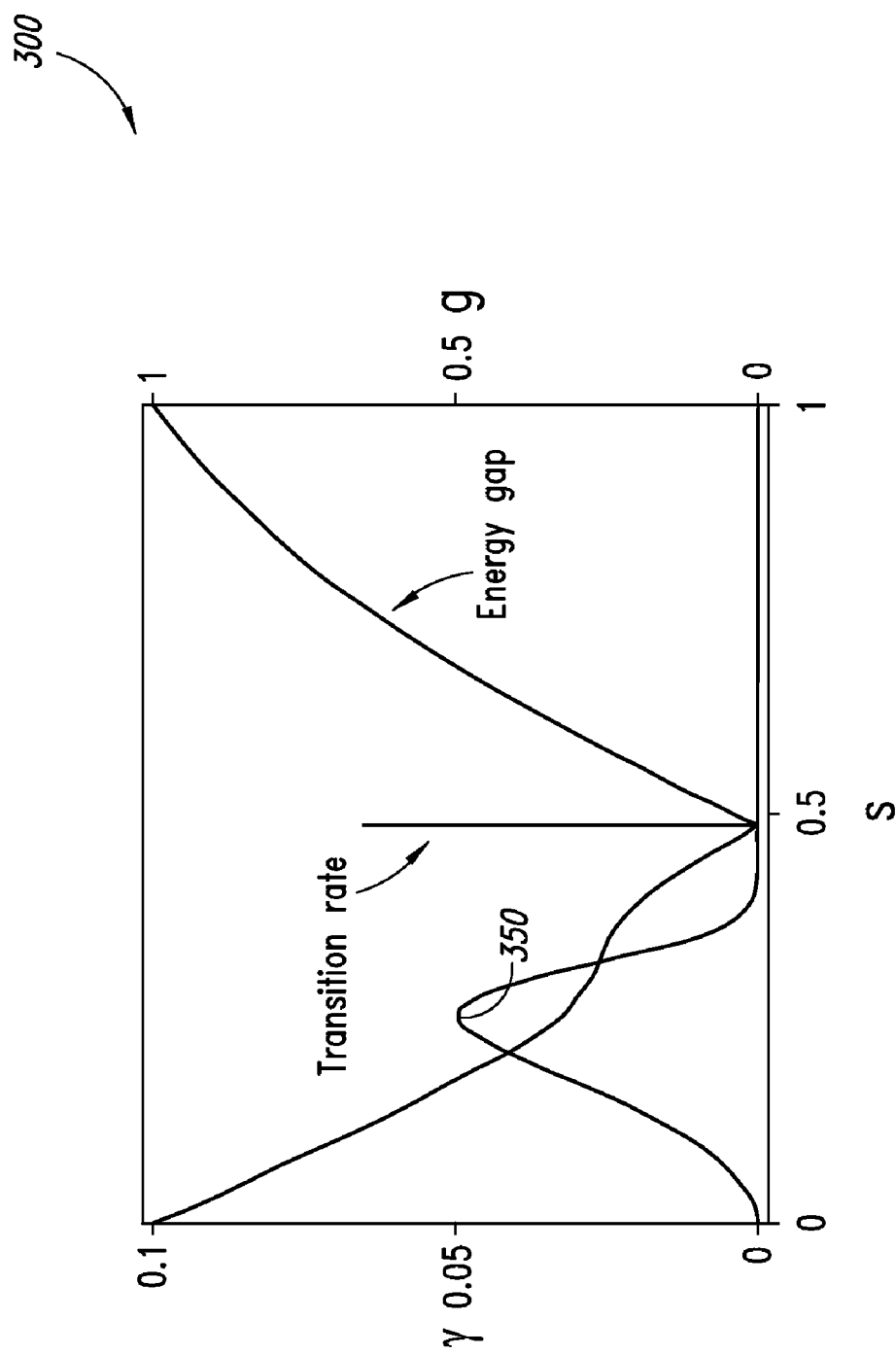
FIG. 3 is a graph showing the transition rate and energy gap according to another illustrative embodiment.

FIG. 3 is a graph 300 of two characteristics of a quantum evolution performed on a quantum processor plotted against the evolution coefficient s. The evolution plotted has a single anti-crossing and a non-degenerate ground state, which can be typical of evolutions run on a quantum processor. The curve labeled "Energy gap" shows the variation of the gap size (energy difference between the ground state and the first excited state) during an evolution. As can be seen from the figure, the gap size is sizeable except for the area close to s=0.5 (the location of the anti-crossing). At that point, the gap size reaches its minimum value and a Landau-Zener transition is likely to occur. The curve labeled "Transition rate" plots the transition rate due to thermal noise between the ground state and first excited state as a function of the evolution schedule. There is a large, narrow peak at the anti-crossing, where thermal excitations of the state of the quantum processor are likely if the temperature of the system exceeds the gap size at the anti-crossing. However, before the anti-crossing, there is a secondary, broad peak 350 where transitions can also occur. For a range of s around peak 350 (approximately 0.2 to 0.4 in FIG. 3) the higher transition rate makes a transition possible if the system were sufficiently excited to overcome the gap size.

One way of achieving excitation of the quantum processor at peak 350 is by increasing the thermal energy of the quantum processor, such as by increasing the temperature of the quantum processor. Another way of exciting the quantum processor is the application of a microwave pulse with a frequency corresponding to the gap size corresponding to a given evolution coefficient s. For example, if the evolution is at s=0.25, then a microwave pulse with a frequency equal to the gap size at s=0.25 is applied in order to excite the quantum processor into the first excited state (given that it was originally in the ground state). Those of skill in the art will appreciate that the excitation of the quantum processor may be achieved by other means.

By taking advantage of peak 350, a quantum processor starting in the ground state can be excited to the first excited state near the beginning of the adiabatic evolution (s<0.5). Then, the quantum processor may be evolved past the anti-crossing sufficiently fast (non-adiabatically) to induce a Landau-Zener transition back to the ground state. (For any gap size, there is an evolution speed for which Landau-Zener transitions are very likely to occur.) After passing the anti-crossing, the evolution proceeds adiabatically until it has reached the final Hamiltonian. At the end of the evolution (s=1), the probability that the quantum processor is in the ground state of the final Hamiltonian is increased. Thus, in embodiments of the present systems, methods and apparatus where a transition at an anti-crossing is actually desired, it may be advantageous to have a smaller gap-size at the anti-crossing to facilitate the desired transition. In some embodiments, the effects of non-adiabatically passing an anti-crossing may outweigh the effects of the gap-size at the anti-crossing. Therefore, embodiments of the present systems, methods and apparatus may reduce the significance of the gap-size when compared to standard approaches of adiabatic quantum computation which try to avoid transitions at the anti-crossing and where the gap size is a significant concern.

This form of adiabatic quantum computation, where the evolution passes a given anti-crossing non-adiabatically, does not necessarily require $\dot{s}$, the rate of change of the evolution coefficient s, to vary over time. This is because the adiabatic condition depends on the minimum gap size as well as the rate of evolution. Thus, a given $\dot{s}$ may satisfy the adiabatic condition at some stages in a given evolution and not satisfy the adiabatic condition at other stages in the same evolution. In conventional adiabatic quantum computation, $\dot{s}$ is constant and slow enough such that at all points during the evolution the quantum processor is unlikely to be excited out of the ground state. This means that $\dot{s}$ must be adiabatic at the anti-crossing, resulting in very long evolution times. However, in quasi-adiabatic computation, where a Landau-Zener transition is desired, $\dot{s}$ is not limited by the gap size at the anti-crossing. Thus, in some embodiments, the evolution may be non-adiabatic with $\dot{s}$ having a constant value at the anti-crossing, but adiabatic everywhere else. In other embodiments, the value of $\dot{s}$ may be varied as the evolution proceeds, with the evolution being adiabatic at all points during the evolution except near the anti-crossing.

There is a chance that a quantum processor, after transitioning states due to an excitation at peak 350, may transition back to the original state due to thermal relaxation before the evolution fully passes peak 350, thus nullifying the effect of the initial transition. Then, passing quickly through the anti-crossing would cause another transition resulting in the quantum processor being in the undesirable state (e.g., the first excited state instead of the ground state) at the end of the evolution. Therefore, in some embodiments, the quantum processor is excited at a location on peak 350 such that there is insufficient time for a possible relaxation. For example, by exciting the quantum processor at the tail end of peak 350, there is not enough time for another transition before peak 350 dies off. Since, it may not be known what location on peak 350 is optimal in this regard, in some embodiments the evolution is run multiple times. For example, the evolution may be run multiple times using a microwave pulse to excite the system, with the frequency of the microwave pulse being varied each time. If the microwave frequency is initially small and incrementally increased each time the evolution is repeated, then a frequency for which the probability of the quantum processor being in the ground state at the end of the evolution is highest may be found, i.e., the determined frequency corresponds to the energy gap at the point on peak 350 where a double transition is least likely to occur.

In some embodiments, another approach to address the potential double transition may be taken. For example, where the excitation at peak 350 is by microwave excitation, the absorption coefficient of the microwave pulse may be measured while the microwave pulse is applied, to monitor for peaks in the absorption coefficient (when the microwave is in resonance with the quantum processor). Thus, in some embodiments, when an absorption peak is observed, the evolution is quickly evolved past peak 350 to avoid a second transition, and once peak 350 has been passed, the evolution is returned to an adiabatic rate until the anti-crossing is reached.

Figure 4:
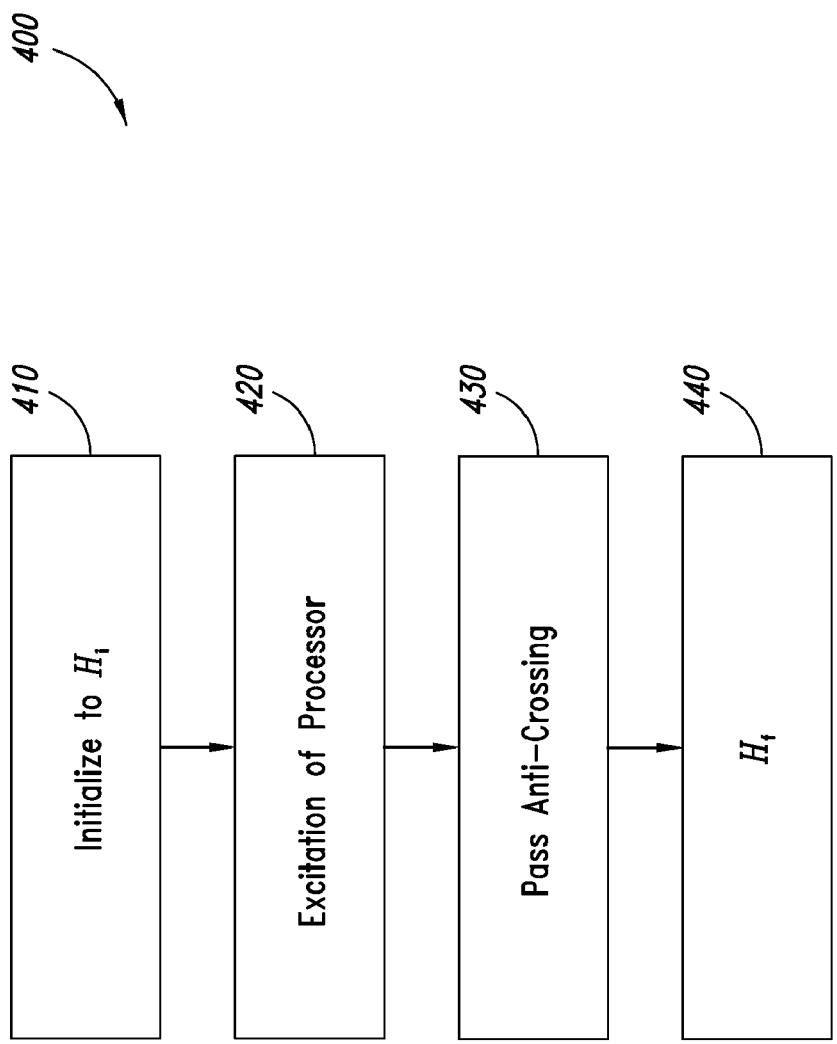
FIG. 4 is a flow diagram showing a method of quasi-adiabatic quantum computation according to another illustrative embodiment.

FIG. 4 shows a flow diagram 400 of one embodiment for quantum computation in accordance with the present systems, methods and apparatus. However, those of skill in the art will appreciate that the present systems, methods and apparatus are not limited by the acts illustrated in FIG. 4.

At 410, a quantum processor, such as system 200 of FIG. 2, is initialized to an initial state described by an initial Hamiltonian $H_i$. In some embodiments, the initial Hamiltonian $H_i$ contains initial values for the local bias devices (for example, local bias devices 230 of FIG. 2) and initial values for the coupling devices (for example, coupling devices 220 of FIG. 2). In some cases, the initial states of the qubits may also be initialized. In some embodiments, the quantum processor is initialized to the ground state of the initial Hamiltonian $H_i$.

At 420, the evolution of the quantum processor from the initial $H_i$ Hamiltonian to the final Hamiltonian begins. In some embodiments, the evolution Hamiltonian during this process may be of the general form $$H_e = A(s)H_i + B(s)H_f,$$

where $A(s)$ and $B(s)$ are functions of the evolution coefficient s, and $A(s)$ goes from 1 to 0 while $B(s)$ goes from 0 to 1. In some embodiments, $A(s)$ and $B(s)$ are linear functions, while in other embodiments, $A(s)$ and $B(s)$ are non-linear functions and/or are optimized to allow for faster adiabatic evolution. Examples of functions $A(s)$ and $B(s)$ that may be used can be found in U.S. Patent Application Ser. No. 60/762,619, which is hereby incorporated by reference in its entirety. During evolution, the quantum processor is excited (such as from the ground state to the first excited state) before it passes an anti-crossing, causing the state of quantum processor to transition to an excited state. In some embodiments, the evolution 420 may be performed adiabatically while the excitation is occurring, favoring avoidance of unwanted energy level transitions.

In some embodiments, the excitation of the quantum processor is achieved by applying a microwave pulse to the quantum processor. For example, microwave pulses may be applied via a large wire coil that encloses or is in proximity to the quantum processor, providing a uniform excitation signal to all the qubits in the quantum processor. Alternatively, thermal excitation may be employed by increasing the temperature of the quantum processor during evolution or by holding the processor at a constant elevated temperature during evolution. This may, for example, involve changing the temperature of the environment in which the quantum processor is located.

At 430, the evolution of the state of the quantum processor non-adiabatically passes an anti-crossing in the evolution Hamiltonian. As previously discussed, if the quantum processor passes the anti-crossing non-adiabatically, the probability of a transition occurring is close to or equal to 1. Thus, if the quantum processor is in the first excited state due to the excitation at 420, there is a high probability that it will transition to the ground state when passing the anti-crossing. The faster the quantum processor passes the anti-crossing, the greater the probability of transition.

At 440, the quantum processor is evolved to the final Hamiltonian. In some embodiments, the rate of evolution after passing the anti-crossing is adiabatic. Once the final Hamiltonian is reached, then all or a portion of the qubits in the quantum processor are measured, such as through readout devices 240 in system 200 of FIG. 2. In some embodiments, the quantum processor reaches the ground state of the final Hamiltonian $H_f$ at the end of evolution to the final Hamiltonian 440.

In some embodiments, the final Hamiltonian $H_f$ represents a computational problem and the final state of the quantum processor is a solution to the problem. In some embodiments, the ground state of the final Hamiltonian $H_f$ encodes the optimal solution to the computational problem.

In some embodiments, all the acts of method 400 except for 430 are performed adiabatically. The acts shown in flow chart 400 may be repeated more than once for the same $H_i$ and $H_f$. For example, where microwave pulses are used to excite the quantum processor, repetition of the acts of method 400 allows for the varying of frequencies of the microwave pulse. In some embodiments, the acts of the method 400 may be repeated for different values of $H_i$ but the same $H_f$.

In other embodiments, quantum computation may be achieved without the excitation 420. That is, there is no excitation from the ground state of the quantum processor to an excited state before the quantum processor passes an anti-crossing. In such embodiments, the passing of the anti-crossing still occurs non-adiabatically while the rest of the evolution is adiabatic. Such an evolution relies upon the effects of a dissipative environment on the quantum processor, such as thermal noise from the outside environment.

Prior efforts at achieving quantum computation have been aimed at minimizing the effects of noise on the quantum processor to avoid excitation and mixing of states. This involves evolving the quantum processor for a time, $t_f$, that is longer than the adiabatic time scale, $t_a$, where $t_a$ is a function of the gap size and denotes the minimum evolution time necessary to ensure that the evolution is adiabatic at all points. However, the effects of a dissipative environment introduces a new time scale, $t_d$, the time scale characteristic for thermal mixing of the quantum processor. If the time taken for evolving the processor exceeds, $t_d$, the result is thermal mixing of the state of the processor, usually occurring at the anti-crossing. Unlike Landau-Zener transitions which completely switch the state, thermal mixing allows the state of the quantum processor to be in a classical mixture of states. Thus, if a quantum processor experiences thermal mixing at the anti-crossing, there is at worst a 50% probability that the quantum processor is still in its ground state at the end of the evolution.

Figure 5:
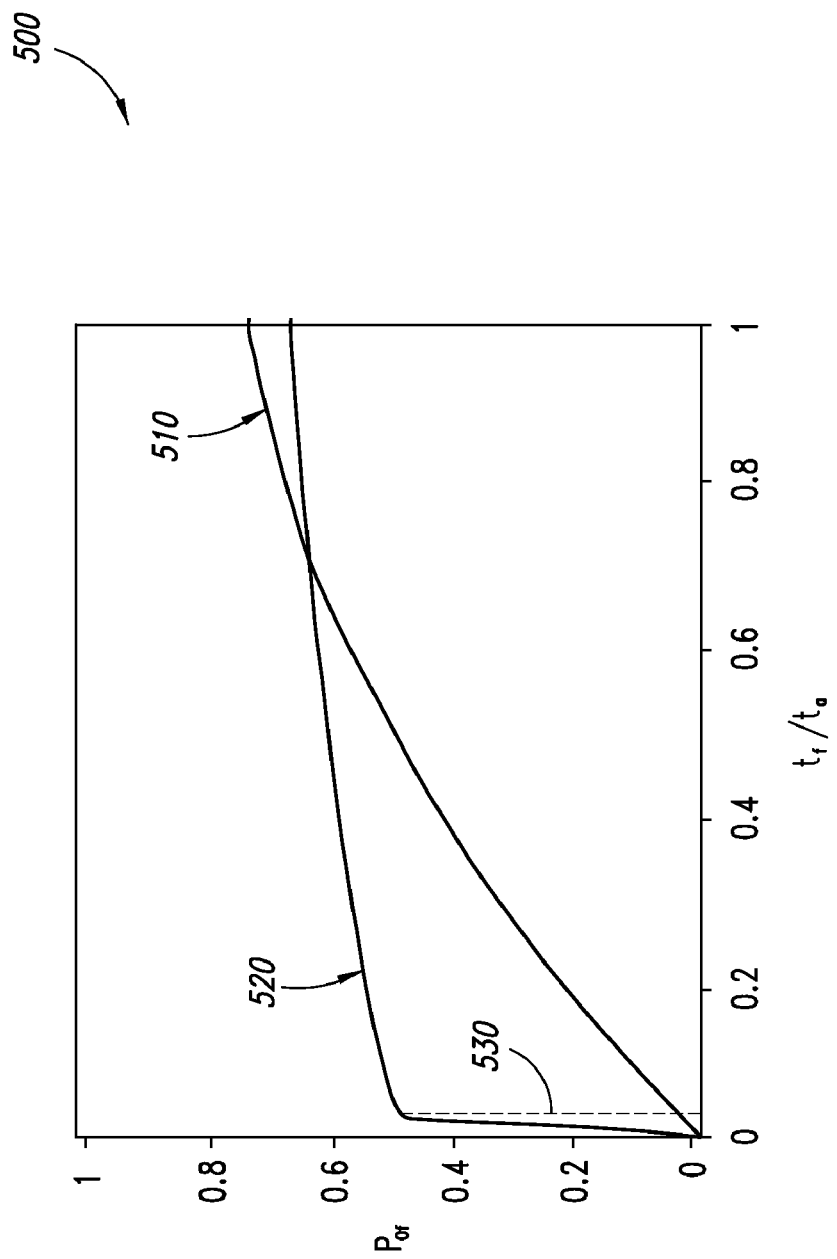
FIG. 5 is a graph showing the probability of being in the ground state of an evolution according to another illustrative embodiment.

FIG. 5 shows a graph 500 of the probability, $P_{0f}$, of being in the ground state at the end of an evolution of a quantum processor versus the normalized time of evolution. Curve 510 shows a typical adiabatic evolution with a very weak dissipative environment ($t_d > t_a$), wherein for a relatively long evolution time ($t_a \leq t_f \leq t_d$) the probability $P_{0f}$ asymptotically approaches 1. The goal of conventional adiabatic quantum evolution is to evolve slowly enough to achieve a high probability of being in the ground state without introducing thermal excitations. However, in practice it is hard to reduce the effect of the dissipative environment so that thermal mixing does not occur.

Curve 520 shows an aspect of the present systems, methods and apparatus wherein thermal mixing time $t_d$ is smaller than the adiabatic time scale $t_a$. In this case, the characteristic time for when thermal mixing occurs is shorter than the adiabatic evolution time. Thus, thermal mixing prevents the state of the quantum processor from being completely in the ground state even if an evolution was performed slowly enough to achieve adiabaticity. Persons of ordinary skill in the art will appreciate that this is undesirable. However, the present systems, methods and apparatus, employ thermal mixing to achieve a faster evolution.

In some embodiments, evolution of a quantum processor with a dissipative environment may proceed in a similar fashion to that illustrated in FIG. 4. The quantum processor starts from an initial Hamiltonian (410) and evolves to a final Hamiltonian (440), with the evolution proceeding adiabatically except when passing an anti-crossing of the evolution Hamiltonian (430). Due to the thermal mixing time being smaller than the adiabatic time scale, thermal mixing of the state of the quantum processor occurs while the anti-crossing is being non-adiabatically passed. (Note that act 420 does not take place in this embodiment.) At the end of the evolution, the state of the quantum processor is measured. However, since the thermal mixing reduces the probability of having the quantum processor in the ground state of the final Hamiltonian, the measured result may not be the ground state. Thus, in some embodiments, the evolution is performed multiple times and the state of the quantum processor is measured and the results are stored and compared (such as storing the results in memory and comparing them using a conventional digital computer). Evolution may be repeated until one or more stopping conditions are met.

For example, the evolution may be repeated a predetermined number of times or for a predetermined length of time and the final state with the lowest energy, which in some cases is the ground state, may be chosen as the final result of the computation. In other embodiments, the final state that occurs with the most probability (the final state that occurs most frequently) may be selected as the final result of the computation. In some embodiments, the result is checked after the first evolution is performed to verify that it is an actual solution to the computational problem and that the criteria for an acceptable solution are met. If the criteria are not met, then the evolution may be repeated and the next result checked. This may continue until a solution is found that meets all or a minimum number, proportion, etc., of the criteria. Such embodiments may be useful for computational problems that are decision problems and have solutions that are verifiable in polynomial time (e.g., NP problems), or for problems for which the solution cannot be checked directly but for which threshold criteria exist. In some embodiments, the evolution schedule may be varied between repetitions of the evolution.

Adiabatic evolution curve 510 of FIG. 5 has a typical normalized evolution time of 1 (the right edge of graph 500) or greater. That is, the time needed for adiabatic evolution must be equal to or greater than $t_a$. At that time, the probability of being in the ground state of the final Hamiltonian is substantial (greater than 0.5). The speed of the adiabatic evolution is limited by the adiabatic passing of the anti-crossing, which greatly increases the time needed to perform a completely adiabatic evolution. In instances where thermal mixing is introduced to the evolution and the evolution non-adiabatically passes an anti-crossing (such as curve 520), the probability of being in the ground state rises quickly but then levels off at around 0.5. Thus, there is no need for the evolution time to be as long as that for curve 510. Element 530 shows an example of an evolution time when the evolution relies on the thermal mixing of states at the anti-crossing. As can be seen, since the quantum processor does not have to pass the anti-crossing adiabatically, the whole evolution may be done at a much faster speed. Thus, by non-adiabatically crossing an anti-crossing and intentionally introducing thermal mixing into the quantum processor, the evolution time can be shortened. Even though the evolution may need to be performed multiple times to compensate for thermal mixing, it is important to remember that conventional adiabatic evolution 510 would also typically be performed multiple times. Therefore, by performing an evolution that includes non-adiabatically passing an anti-crossing, there can be a net time savings. Further details on this form of adiabatic quantum computation may be found in Amin, M. H. S. et al., "Thermally assisted adiabatic quantum computation" arXiv.org: cond-mat/0609332v2 (2007), pp 1-5.

Figure 6:
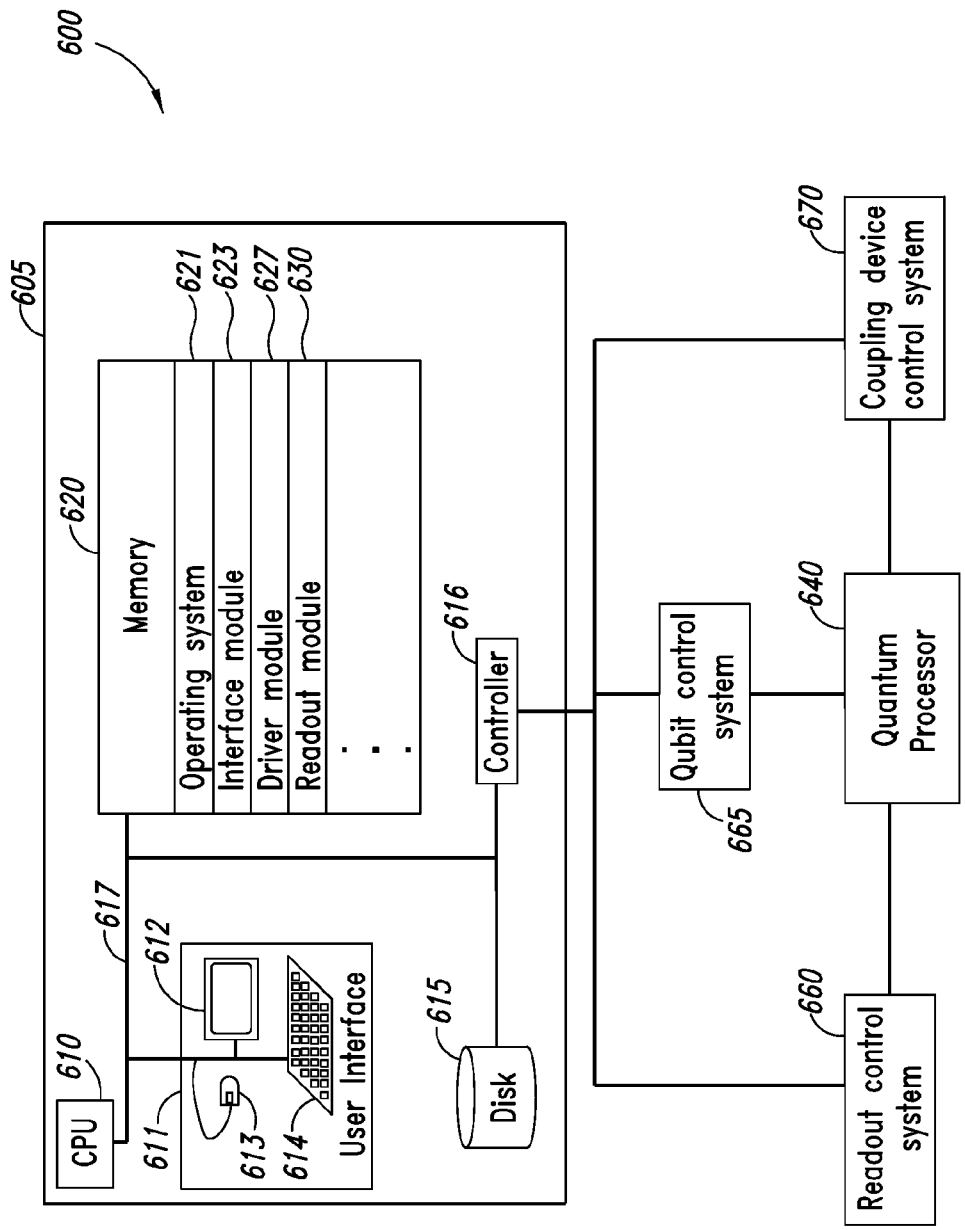
FIG. 6 is a block diagram showing a computing system according to another illustrative embodiment.

FIG. 6 illustrates a system 600 that is operated in accordance with one or more embodiments of the present methods. System 600 includes at least one digital (binary, conventional) interface computer 605. Computer 605 includes standard computer components including at least one central processing unit 610, memory 620, and non-volatile memory, such as disk storage 615. Both memory 620 and storage 615 may be employed to store program modules and data structures. Interface computer 605 further includes input/output device 611, controller 630 and one or more busses 635 that interconnect the aforementioned components. User input/output device 611 may include one or more user input/output components such as a display 612, mouse 613, and/or keyboard 614.

System 600 further includes a quantum processor 640 capable of performing quantum computation. Embodiments of quantum computation that can be performed by quantum processor 640 have been described previously, but the functions of quantum processor 640 are not limited to what has been previously described. For example, while FIG. 2 illustrates a portion of a system 200 comprising a plurality of superconducting qubits and coupling devices that may be used for quantum processor 640, persons of ordinary skill in the art will appreciate that other devices and layouts are suitable for quantum processor 640. In some embodiments, quantum processor 640 may also comprise a coil surrounding or in proximity to the plurality of qubits (not shown in the figures), capable of applying a microwave pulse of varying frequency to quantum processor 640.

System 600 further includes a readout control system 660, such as devices 240 in FIG. 2. In some embodiments, readout control system 660 comprises a plurality of magnetometers or electrometers (not shown), where each magnetometer or electrometer is inductively coupled, or capacitively coupled, respectively, to a different qubit in quantum processor 640. In such embodiments, controller 616 receives a signal, by way of readout control system 660, from each magnetometer or electrometer in readout control system 660. System 600 optionally comprises a qubit control system 665 for the qubits in quantum processor 640. In some embodiments, qubit control system 665 comprises a magnetic field source or electric field source that is inductively coupled or capacitively coupled, respectively, to a qubit in quantum processor 640. In some embodiments, qubit control system 665 controls local bias devices coupled to the qubits, such as devices 230 in FIG. 2. System 600 may also comprise a coupling device control system 670 to control the couplings between qubits in quantum processor 640.

In some embodiments, memory 620 includes a number of modules and data structures. It will be appreciated that at any one time during operation of the system, all or a portion of the modules and/or data structures stored in memory 620 may be resident in random access memory (RAM) and all or a portion of the modules and/or data structures may be stored in non-volatile memory, such as disk storage 615. Furthermore, although memory 620, including disk storage 615, is shown as housed within computer 605, other configurations are possible. For example, memory 620 may be housed within computer 605 or it may be housed within one or more external devices (not shown) that are addressable by computer 605 across a network (e.g., a wide area network such as the Internet).

In some embodiments, memory 620 includes an operating system 621. Operating system 621 may include procedures for handling various system services, such as file services, and for performing hardware-dependent tasks. In some embodiments, the programs and data stored in memory 620 include a quantum computation device interface module 623 for defining and executing a quantum computation to be solved on quantum processor 640. In some embodiments, memory 620 includes a driver module 627. Driver module 627 includes procedures for interfacing with and handling the various peripheral units to computer 605, such as controller 616 and readout control system 660, qubit control system 665, coupling device control system 670, and quantum processor 640. In some embodiments, the programs and data stored in memory 620 further include a readout module 630 for interpreting the data from controller 616 and readout control system 660.

The functionality of controller 616 may be divided into two classes of functionality: data acquisition and control. In some embodiments, two different types of chips are used to handle each of these discrete functional classes. Data acquisition can be used to measure physical properties of the qubits in quantum processor 640 after evolution has been completed. Such data can be measured using any number of customized or commercially available data acquisition microcontrollers including, but not limited to, data acquisition cards manufactured by Elan Digital Systems (Fareham, UK) such as the AD132, AD136, MF232, MF236, AD142, AD218 and CF241 cards. In some embodiments, data acquisition and control is handled by a single type of microprocessor, such as the Elan D403C or D480C. In other embodiments, there are multiple controllers 616 in order to provide sufficient control over the qubits in a computation on quantum processor 640 and in order to measure the results of a quantum computation on the quantum processor 640.

Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other problem-solving systems devices, and methods, not necessarily the exemplary problem-solving systems devices, and methods generally described above.

For instance, the foregoing detailed description has set forth various embodiments of the systems, devices, and/or methods via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments.

All of the U.S. patents, U.S. patent application publications, U.S. patent applications, foreign patents, foreign patent applications and non-patent publications referred to in this specification including, but not limited to: U.S. Pat. No. 6,838,694, US Patent Publication No. 2005-0082519, US Patent Publication No. 2006-0225165, U.S. Provisional Patent Application Ser. No. 60/872,414 filed Jan. 12, 2007, entitled "Systems, Devices and Methods for Interconnected Processor Topology", U.S. patent application Ser. No. 11/247,857, U.S. Provisional Patent Application Ser. No. 60/886,253 filed Jan. 23, 2007 and entitled "SYSTEMS, DEVICES, AND METHODS FOR CONTROLLABLY COUPLING QUBITS", and U.S. patent application Ser. No. 11/625,702; are incorporated herein by reference, in their entirety and for all purposes. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the invention to the specific embodiments disclosed in the specification and the claims, but should be construed to include all possible embodiments along with the full scope of equivalents to which such claims are entitled. Accordingly, the scope of the invention shall only be construed and defined by the scope of the appended claims.

I claim:

1. A method of quantum computation comprising:
   initializing a quantum processor to a ground state of an initial Hamiltonian; and
   evolving the quantum processor from the initial Hamiltonian to a final Hamiltonian via an evolution Hamiltonian;
   wherein evolving the quantum processor comprises:
      exciting the quantum processor to an excited state of the evolution Hamiltonian; and
      non-adiabatically passing an anti-crossing of the evolution Hamiltonian.

2. The method of claim 1, wherein the final Hamiltonian encodes a computational problem and a ground state of the final Hamiltonian represents a solution to the computational problem.

3. The method of claim 1, wherein exciting the quantum processor to an excited state includes applying a microwave pulse to the quantum processor.

4. The method of claim 3, wherein applying a microwave pulse to the quantum processor includes applying at least one of a current and a voltage to a coil in physical proximity to the quantum processor.

5. The method of claim 1, wherein exciting the quantum processor to an excited state includes thermally exciting the quantum processor.

6. The method of claim 1, wherein the quantum processor is excited prior to non-adiabatically passing the anti-crossing.

7. The method of claim 1, wherein evolving the quantum processor from the initial Hamiltonian to a final Hamiltonian includes approximately adiabatically evolving the quantum processor except when non-adiabatically passing the anti-crossing.

8. The method of claim 1, wherein exciting the quantum processor to an excited state of the evolution Hamiltonian includes exciting the quantum processor to a first excited state of the evolution Hamiltonian.

9. The method of claim 1, wherein non-adiabatically passing an anti-crossing of the evolution Hamiltonian includes transitioning the quantum processor from the excited state of the evolution Hamiltonian to the ground state of the evolution Hamiltonian.

10. The method of claim 1, further comprising:
repeating the evolution of the quantum processor from the initial Hamiltonian to the final Hamiltonian.

11. The method of claim 10, wherein the evolution is repeated a determined number of times.

12. The method of claim 10, wherein the evolution is repeated for a determined time.

13. The method of claim 10, wherein the evolution is repeated until at least one determined criterion has been satisfied.

14. The method of claim 1, wherein the quantum processor comprises:
a plurality of qubits disposed in a two-dimensional array;
a plurality of coupling devices configurable for coupling two or more of the qubits together;
a plurality of local bias devices; and
at least one readout device for reading out a state of at least one qubit.

15. A quantum computation system, comprising:
a quantum processor;
an excitation device configurable for exciting the quantum processor from a first state to a second state;
a digital processor in communication with the quantum processor; and
a memory storing a set of processor executable instructions that cause the digital processor to facilitate quantum processing, by:
initializing the quantum processor to a ground state of an initial Hamiltonian; and
evolving the quantum processor from the initial Hamiltonian to a final Hamiltonian via an evolution Hamiltonian;
wherein evolving the quantum processor includes:
exciting the quantum processor to an excited state of the evolution Hamiltonian via the excitation device; and
non-adiabatically passing an anti-crossing of the evolution Hamiltonian.

16. The system of claim 15, wherein the final Hamiltonian encodes a computational problem to be solved and a ground state of the final Hamiltonian represents a solution to the computational problem.

17. The system of claim 15, wherein the excitation device is configured to excite the quantum processor via one or more microwave pulses.

18. The system of claim 17, wherein exciting the quantum processor includes varying a frequency of the one or more microwave pulses.

19. The system of claim 15, wherein the excitation device is configured to excite the quantum processor via thermal excitation.

20. The system of claim 15, wherein the quantum processor comprises:
a plurality of qubits disposed in a two-dimensional array;
a plurality of coupling devices configurable for coupling two or more of the qubits together;
a plurality of local bias devices; and
at least one readout device for reading out a state of at least one qubit.

21. The system of claim 15, wherein the memory further comprises instructions for repeating the initialization of the quantum processor and the evolution of the quantum processor.

22. A computer program product for use with a computer system, the computer program product comprising a computer readable storage medium and a computer program mechanism embedded therein, the computer program mechanism comprising:
instructions for initializing a quantum processor to a ground state of an initial Hamiltonian; and
instructions for evolving the quantum processor from the initial Hamiltonian to a final Hamiltonian via an evolution Hamiltonian;
wherein the instructions for evolving the quantum processor comprise:
instructions for exciting the quantum processor to an excited state of the evolution Hamiltonian via the excitation device; and
instructions for non-adiabatically passing an anti-crossing of the evolution Hamiltonian.

23. The computer program product of claim 22, wherein the final Hamiltonian encodes a computational problem to be solved and a ground state of the final Hamiltonian represents a solution to the computational problem.

24. The computer program product of claim 22, wherein the instructions for exciting the quantum processor include instructions for applying one or more microwave pulses to the quantum processor.

25. The computer program product of claim 24, wherein the instructions for exciting the quantum processor include instructions for varying a frequency of the one or more microwave pulses.

26. The computer program product of claim 22, wherein the instructions for exciting the quantum processor include instructions for exciting the quantum processor via thermal excitation.

27. The computer program product of claim 22, further comprising:
instructions for repeating the evolution of the quantum processor from the initial Hamiltonian to a final Hamiltonian.

28. A method of quantum computation, comprising:
initializing a quantum processor to a ground state of a first Hamiltonian; and
evolving the quantum processor from the first Hamiltonian to a second Hamiltonian via an evolution Hamiltonian, wherein evolving the quantum processor comprises non-adiabatically passing an anti-crossing of the evolution Hamiltonian; and
measuring an end state of the quantum processor.

29. The method of claim 28, wherein the second Hamiltonian encodes a computational problem to be solved and a ground state of the second Hamiltonian represents a solution to the computational problem.

30. The method of claim 28, further comprising:
verifying that the end state is an acceptable solution to the computational problem.

31. The method of claim 28, further comprising:
repeating the initializing, evolving and measuring for a number of cycles until a stopping condition is met.

32. The method of claim 31, further comprising:
storing the end state for each cycle; and
selecting a final state from the stored end states.

33. The method of claim 32, wherein selecting a final state from the stored end states includes selecting a lowest energy final state.

34. The method of claim 32, wherein selecting a final state from the stored end states includes selecting a most frequently occurring final state.

35. The method of claim 32, further comprising:
verifying that the selected final state is an acceptable solution to the computational problem.

36. The method of claim 31, wherein the stopping condition is at least one of a predetermined number of cycles and a predetermined time.

37. The method of claim 28, wherein the quantum processor comprises:
a plurality of qubits disposed in a two-dimensional array;
a plurality of coupling devices configurable for coupling two or more of the qubits together;
a plurality of local bias devices; and
at least one readout device for reading out a state of at least one qubit.

38. The method of claim 28, wherein evolving the quantum processor further includes thermal mixing of a state of the quantum processor when passing the anti-crossing.

39. The method of claim 28, wherein evolving the quantum processor further includes evolving the quantum processor adiabatically except when passing the anti-crossing.

40. The method of claim 28, wherein evolving the quantum processor further includes exciting the quantum processor to an excited state of the evolution Hamiltonian.

41. A method of quantum computation, comprising:
initializing a quantum processor to a ground state of an initial Hamiltonian; and
evolving the quantum processor from the initial Hamiltonian to a final Hamiltonian via an evolution Hamiltonian, wherein evolving the quantum processor comprises thermally mixing at least one state of the quantum processor; and
measuring a final state of the quantum processor.

42. The method of claim 41, wherein the final Hamiltonian encodes a computational problem to be solved and a ground state of the final Hamiltonian represents a solution to the computational problem.

43. The method of claim 41, further comprising:
verifying that the final state is an acceptable solution to the computational problem.

44. The method of claim 41, further comprising:
repeating the initializing, evolving and measuring until a stopping condition is met.

45. The method of claim 41, wherein the quantum processor comprises:
a plurality of qubits disposed in a two-dimensional array;
a plurality of coupling devices configurable for coupling two or more of the qubits together;
a plurality of local bias devices; and
at least one readout device for reading out a state of at least one qubit.

46. The method of claim 41, wherein thermally mixing at least one state of the quantum processor includes thermally mixing the at least one state of the quantum processor when passing an anti-crossing of the evolution Hamiltonian.

47. The method of claim 46, wherein passing an anti-crossing of the evolution Hamiltonian includes passing the anti-crossing non-adiabatically.

48. The method of claim 41, wherein evolving the quantum processor includes evolving the quantum processor adiabatically except when thermally mixing the state of the quantum processor.

49. The method of claim 41, wherein evolving the quantum processor further includes exciting the quantum processor to an excited state of the evolution Hamiltonian.

* * * * *